United States Patent [19]

Hoshino et al.

[11] 3,954,131

[45] May 4, 1976

[54] PNEUMATIC SAFETY TIRE

[75] Inventors: Takashi Hoshino, Tama; Akira Fujikawa, Kodaira, both of Japan

[73] Assignee: Bridgestone Tire Company Limited, Tokyo, Japan

[22] Filed: Mar. 14, 1975

[21] Appl. No.: 558,383

Related U.S. Application Data

[63] Continuation of Ser. No. 370,262, June 15, 1973, abandoned.

[30] Foreign Application Priority Data

June 21, 1972 Japan.............................. 47-62114
Mar. 12, 1973 Japan.............................. 48-27924

[52] U.S. Cl. .................... 152/354; 152/330 RF; 152/353 R; 152/357 R; 152/374
[51] Int. Cl.² .................... B60C 9/02; B60C 13/00; B60C 17/00
[58] Field of Search............ 152/152, 153, 330 RF, 152/330 R, 352-357, 362 R, 374

[56] References Cited

UNITED STATES PATENTS

| | | | |
|---|---|---|---|
| 3,339,610 | 9/1967 | Fausti et al. ......................... | 152/354 |
| 3,464,477 | 9/1969 | Verdier............................... | 152/353 |
| 3,841,375 | 10/1974 | Edwards ....................... | 152/330 RF |

*Primary Examiner*—Drayton E. Hoffman
*Attorney, Agent, or Firm*—Sughrue, Rothwell, Mion, Zinn & Macpeak

[57] ABSTRACT

A pneumatic safety tire having a pair of annular elastomeric reinforcements applied to tire carcass, each reinforcement having an intermediate portion which is located at a position corresponding to the junction of sidewall and tread. Each reinforcement extends toward both the tire equator and the corresponding one of tire beads, while gradually diminishing its thickness as it extends away from the intermediate portion. The maximum thickness of the reinforcement is 3 to 15% of the maximum tire section width under inflated condition.

19 Claims, 9 Drawing Figures

FIG_1
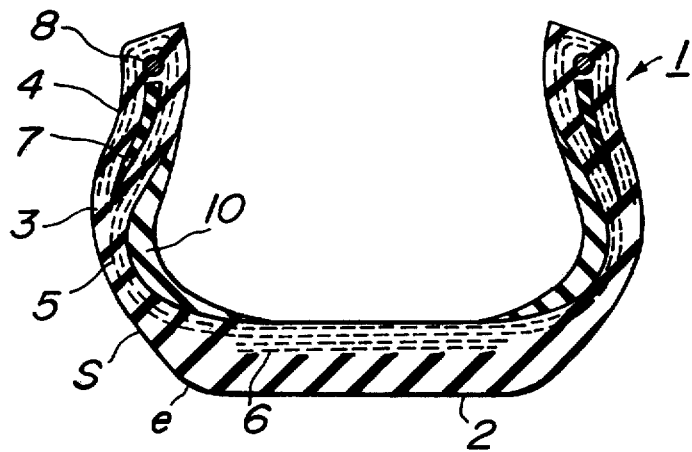
FIG_2
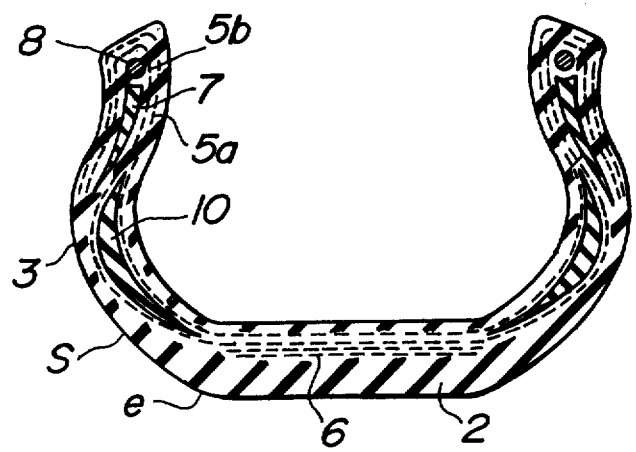

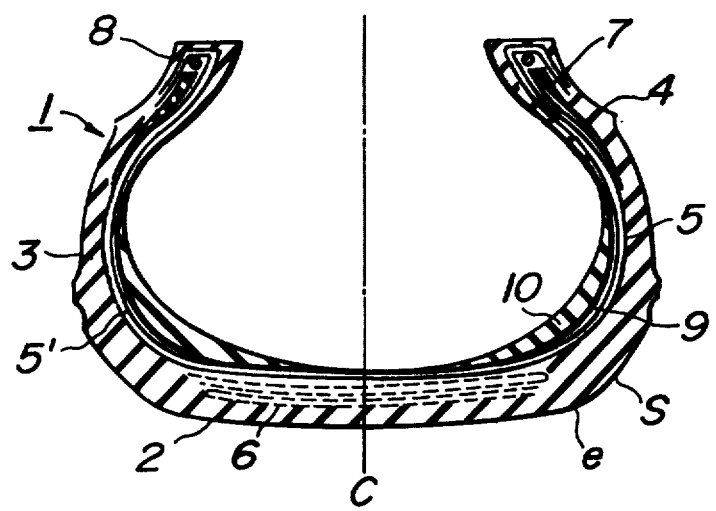
FIG_3
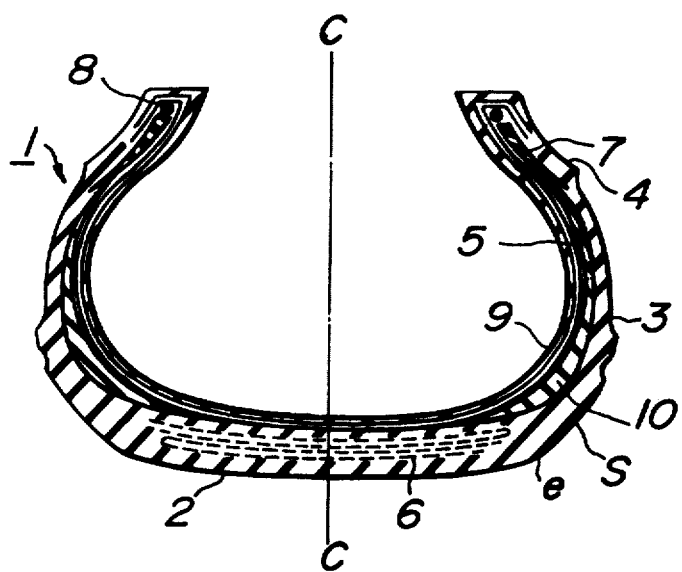
FIG_4

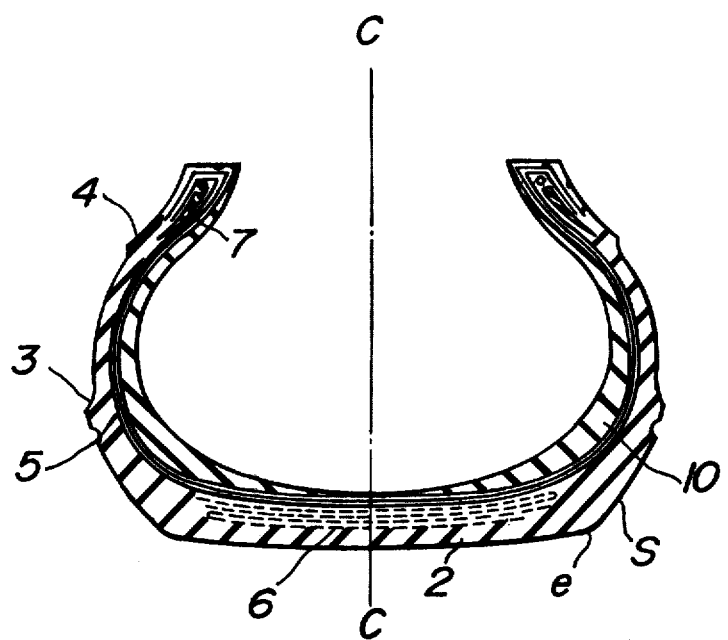
FIG_5

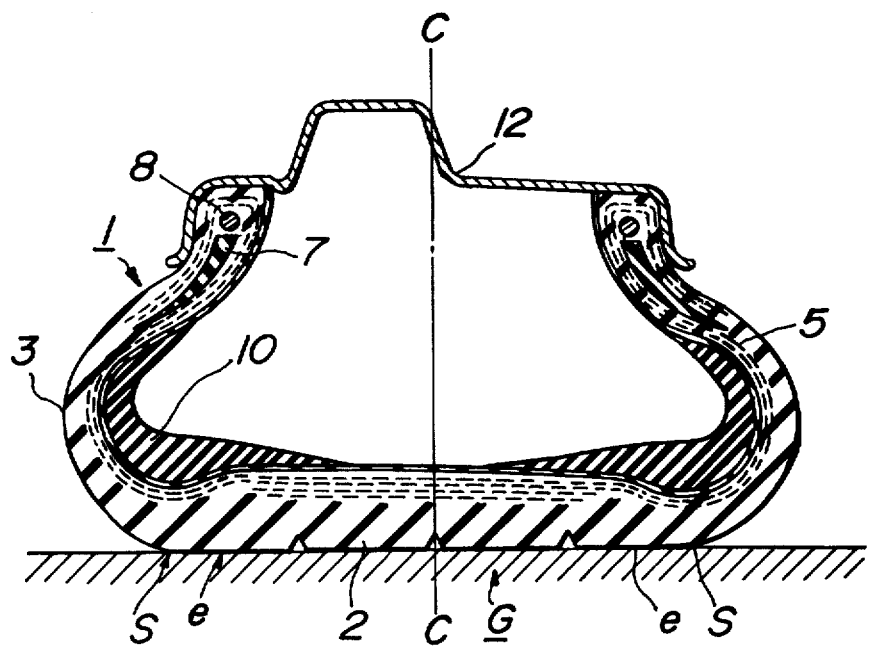
FIG_6
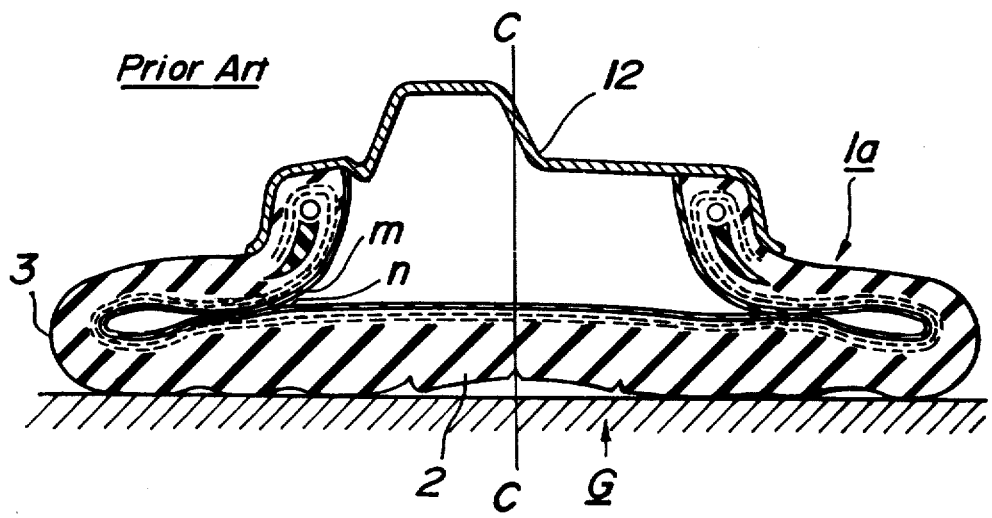
FIG_7
Prior Art

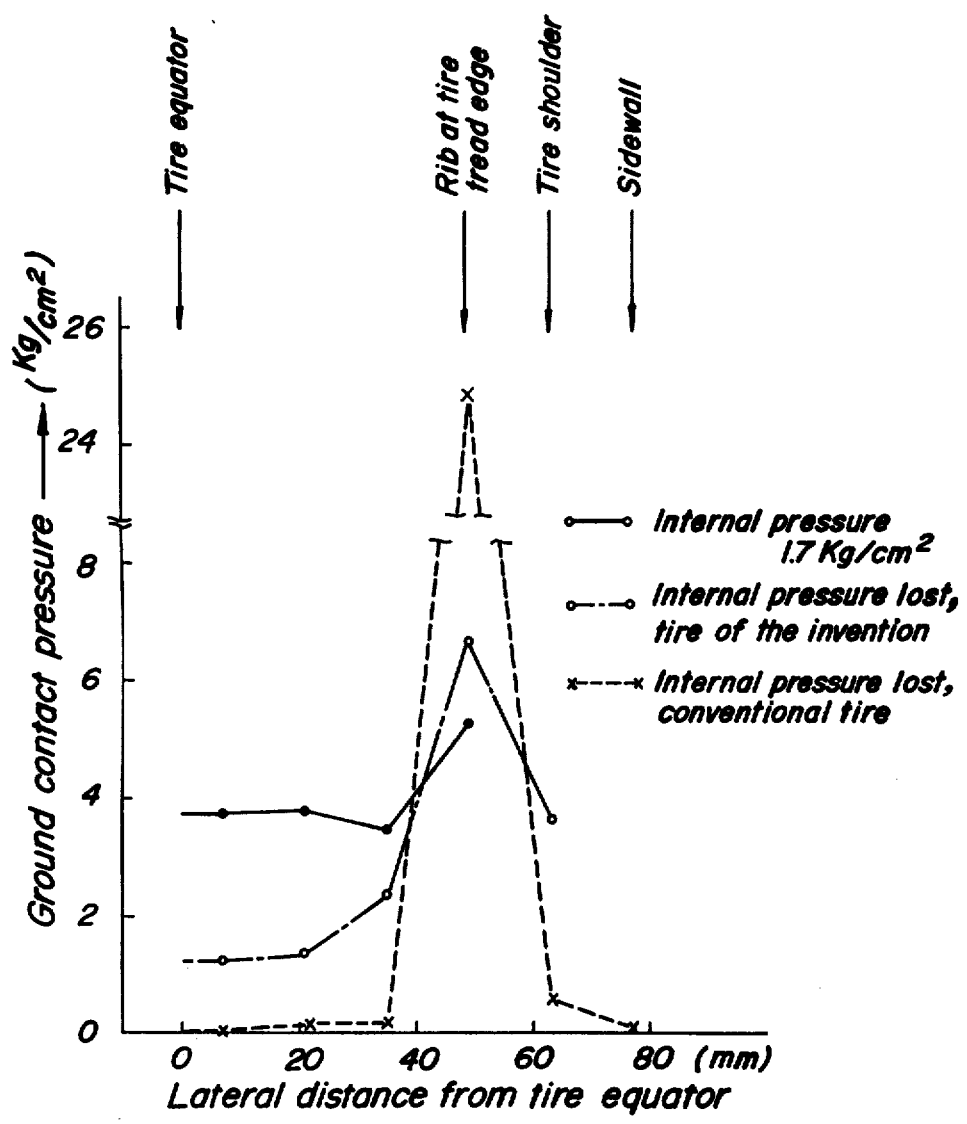
FIG_9

PNEUMATIC SAFETY TIRE

This is a continuation of application Ser. No. 370,262, filed June 15, 1973, now abandoned.

BACKGROUND OF THE INVENTION

1. Field of the Invention

This invention relates to a pneumatic safety tire, and more particularly to a pneumatic tire which is suitable for high speed driving on a highway while ensuring safe driving even when its pneumatic pressure is suddenly lost by puncture or burst, so that the punctured or burst tire can be driven to a place for repair over a long distance without necessitating immediate replacement with a sound tire. The present invention is more specifically directed to an improvement in the high-speed performance of a safety tire.

2. Description of the Prior Art

To allow vehicle movement even after a tire puncture or burst, various safety means have been proposed heretofore. For instance, U.S. Pat. No. 3,207,200, which was granted to G. X. R. Boussu on Sept. 21, 1965, teaches a double layered tire comprising a tire casing and an air impervious liner; U.S. Pat. No. 3,238,988, which was granted to A. Roque V on Mar. 8, 1966, suggestes a punctureless tire having parabolic shaped resilient steel wires; and U.S. Pat. No. 3,464,477, which was granted to Henri Verdier on Sept. 2, 1969, teaches the use of an extra elastomer layer reinforcement in a pneumatic radial tire. The conventionally proposed pneumatic tires of double layered construction have a shortcoming in that the increased weight thereof tends to greatly impair the high-speed performance, despite its improved safety. Thus, the double layered tire cannot be used in vehicles for highway running. The use of an additional heavy rubber layer for the double layer construction also results in a considerable cost increase.

The conventional punctureless tires are not pneumatic tires, so that they are inferior to the pneumatic tires as far as comfort to the driver is concerned.

The tire of Verdier has improved protection against side cuts, but once being punctured or burst, the Verdier tire easily loses operational stability. The reason for the loss of the stability is the fact that the rigidity of the sidewall of the Verdier tire is small, so that, upon loss of its internal pressure, the tire collapses and the bead portions of the tire come into contact with the tread portion thereof. When this happens, the bead portions and the tread portion move somewhat differently while the effective contact area between the tire and the road surface is reduced. Accordingly, if a puncture should happen during high speed driving on a highway, the driver may lose the control of the car because of the sudden drop of the contact area between the tire and the road surface.

Japanese Pat. Laid-open Specification No. 1,106/1972, which was filed on June 16, 1971 by Dunlop Holdings Limited based on British Patent Application No. 30,030/70 of June 20, 1970, suggests the use of a reinforcing member made of soft rubber at the sidewall of a radial tire. The soft rubber reinforcement is, however, ineffective at the time of puncture, because it is easily compressed. Accordingly, such a tire with soft rubber reinforcement cannot prevent the aforesaid sudden reduction of effective contact area between the tire and the road surface, which contact area reduction is very dangerous if it should occur during high-speed driving on a highway.

British Pat. Specification No. 867,103, which was granted to Metzeler Gummiverke A. G. on May 3, 1961, suggests stiffeners which are attached to the insides of the sidewalls of a tire and have wedge-shaped gaps. The stiffeners of Metzeler act to retain a large contact area between the tire and the road surface even after the tire is punctured. The Metzler Stiffeners, however, have a shortcoming in that, as the tire rolls on the road surface after the tire puncture, large friction is caused at the wedge-shaped gaps, so that the temperature of the stiffeners is raised excessively at such gaps. Consequently, the stiffeners themselves will be burnt off after running for a short while.

SUMMARY OF THE INVENTION

Therefore, an object of the present invention is to provide a pneumatic safety tire for high speed driving on highways, which tire comprises a pair of annular beads, a carcass means extending across the two beads, an annular tread portion formed on the outer peripheral surface of the carcass and having a pair of shoulders formed at opposing edges thereof, a pair of sidewalls each extending between one of the beads to the corresponding edge of the tread portion, and a pair of annular elastomeric reinforcements each being disposed adjacent the carcass so as to extend in parallel with the junction between the sidewall and the tread portion, each said elastomeric reinforcement consisting of an elastomer having a JIS (Japanese Industrial Standard) hardness of not smaller than 45 and a maximum thickness of 3 to 15 percent of the maximum tire width when the tire is inflated under pressure, the thickness of each said elastomeric reinforcement gradually diminishing as the reinforcing member extends toward the corresponding bead and the tire equator.

In order to ensure a wide effective contact area between the tire tread and the road surface even after the tire is punctured, one may think of using a heavy lining at the inside surface of the tire tread. This is not practical in the case of tires for running at a high speed on a highway, because the heavy lining along the tire tread results in an excessively large centrifugal force acting on the tread portion, so as to cause the narrow equatorial portion of the tire to come in contact with the road surface. Consequently, the effective contact area between the tire and the road surface tends to be reduced at a high driving speed, if the inside of the tire tread is heavily lined.

Thus, with the pneumatic tire according to the present invention, the elastomeric reinforcing members are made increasingly thin as they extend toward the tire equator.

On the other hand, if the elastomeric reinforcing members are made of too soft rubber material, the rigidity of the sidewalls is not large enough to prevent the flexing of the tire sidewalls at the time of tire puncture, and a wide effective contact area between the tire and the road surface cannot be ensured. Thus, the hardness of the elastomer for the elastomeric reinforcement is selected to be not less than 45, as determined by the stipulations of Japanese Industrial Standard JIS K6301-5. Similarly, to ensure a sufficiently large effective contact area between the tire and the road surface, the thickness of the elastomeric reinforcement at the thickest portion thereof (to be referred to as the maximum thickness of the reinforcement, hereinafter), as measured in a normal direction to the inner surface thereof, is selected to be not less than 3% of the maximum tire section width under inflated condition. The maximum tire section width is the maximum distance between opposing outer surfaces of the tire sidewalls, which distance is taken in parallel to the axis of rotation of the tire. If the maximum thickness of the elastomeric reinforcement is less than 3% of the maximum tire section width, the reinforcement itself may be easily bent upon puncture of the tire, and the sidewall rigidity under the inflated conditions is lost, so that the desired action of maintaining the large effective contact area between the tire and the road surface cannot be achieved.

The maximum thickness of the elastomeric reinforcement, as measured in the normal direction to the inner peripheral surface thereof, is selected to be not greater than 15% of the maximum tire section width under inflated condition. The reinforcement, whose maximum thickness is greater than 151% of the maximum tire section width, will result in an insufficient heat dissipation therefrom, and the tire temperature will rise too high when it is run at a high speed, e.g., at 100 Km/hour or faster.

In short, the present invention provides an improved pneumatic safety tire, which simultaneously enables both high speed running on highways and safe driving after puncture. With conventional tires, if tire puncture should occur on highways when a car is running at a high speed, a dangerous situation is caused, because the car driver may lose the control of the car due to the sudden reduction of the effective contact area between the tire and the road surface. None of the conventional pneumatic tires have succeeded in completely eliminating such risk. On the other hand, the pneumatic safety tire of the invention can eliminate it in a reliable fashion.

BRIEF DESCRIPTION OF THE DRAWING

For a better understanding of the invention, reference is made to the accompanying drawing, in which:

FIG. 1 is a sectional view of a pneumatic safety tire according to the present invention;

FIG. 2 is a sectional view of a modification of the tire, as illustrated in FIG. 1;

FIG. 3 is a sectional view of a pneumatic tubeless tire having elastomeric reinforcements whose thickest portions are disposed at positions corresponding to the tire shoulders;

FIG. 4 is a sectional view of a modification of the tire, as illustrated in FIG. 3;

FIG. 5 is a sectional view of another tire according to the present invention, in which thinned portions of the resilient reinforcements are so disposed that the resilient reinforcement layers are hardly separable from the inner surface of the carcass;

FIG. 6 is a sectional view of a tire according to the present invention under punctured conditions;

FIG. 7 is a view similar to FIG. 6, illustrating the punctured condition of a conventional pneumatic tire;

FIG. 9 is a graph, showing the distribution of load stress on tire treads under normal and punctured conditions.

Like parts are designated by like numerals throughout the different figures of the drawing.

DESCRIPTION OF THE PREFERRED EMBODIMENTS

Figure 8:
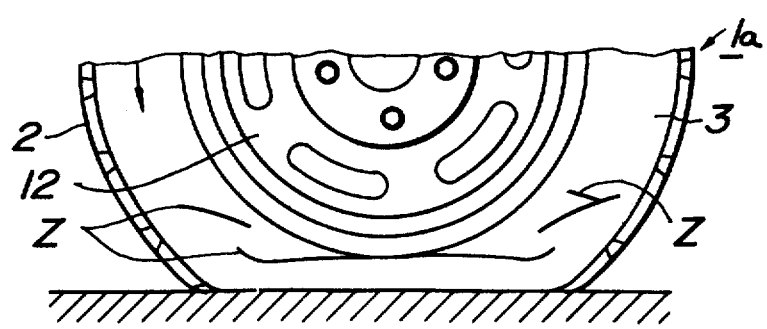
FIG. 8 is a side view of the conventional tire of FIG. 7.

FIG. 1 illustrates, in a sectional view, a pneumatic safety tire with elastomeric reinforcements, according to the present invention. The tire 1 comprises a tread 2, a pair of sidewalls 3 which extend from opposing edges of the tread to the corresponding one of a pair of bead portions 4, and a carcass 5 consisting of bias cords and extending across the two bead portions 4 along the sidewalls and the tread. One or more breaker plies 6 are disposed between the tread 2 and the carcass 5, and a pair of shoulder portions S are formed on the body of the tire between the edges e of the tread 2 and the sidewalls 3 thereof, as shown in the figure. A pair of resilient reinforcements 10 are disposed on the inner surface of the tire 1, one on each side of tire equator plane C—C.

Each of the elastomeric reinforcements 10 has one edge disposed on the inner surface of the carcass 5 at a position opposite to the edge e of the tread portion 2, while the opposing edge of the reinforcement 10 extends toward the corresponding bead portion 4. The other one of the elastomeric reinforcements 10 are disposed in a symmetric fashion to the aforesaid reinforcement 10, relative to the tire equator plane C—C. As is apparent from FIG. 1, the thickness of each elastomeric reinforcement 10 diminishes as it extends toward the tread portion 2 and the bead portion 4, and the thickest portion of the reinforcement 10 is located adjacent the thinnest portion of the corresponding sidewall 3 of the tire 1. As a result, the overall thickness of the tire side portion, including the sidewall 3 and the reinforcement 10 is substantially uniform, from the bead portion 4 to the shoulder S. In the embodiment of FIG. 1, the bead side edge of the reinforcement 10 and the tread side end of the stiffener 7 face each other through the sidewall 3 having the carcass 5.

In another embodiment of the present invention, as illustrated in FIG. 2, elastomeric reinforcements 10 are disposed between a pair of carcass plies 5a and 5b. In this embodiment, two reinforcements 10 are used, one on each sidewall 3 of a pneumatic tire 1, as in the case of the preceding embodiment. The cross sectional shape of each reinforcement 10 of this embodiment is so chosen that the overall thickness of the sidewall 3 is substantially uniform from the bead portion 4 to the shoulder S. More particularly, the thickness of each elastomeric reinforcement 10 diminishes as it extends toward the bead portion 4 and the edge e of the tire tread 2.

FIG. 3 illustrates a tubeless tire with the socalled carcass, which tire is provided with elastomeric reinforcements according to the present invention. A tubeless tire 1 has a pair of beads 8 and a carcass 5 extending across the two beads. The carcass 5 consists of parallel cords, preferably rubberized cords, which are substantially radially disposed about an axis of rotation (not shown) of the tire. Each of the opposing edge portions of the carcass 5 is turned about the corresponding bead 8, and a stiffener 7 is disposed in the proximity of the bead 8. A rubber layer surrounds the stiffener 7 and the bead 8 together with the turned-back portion of the carcass 5, so as to form stiff bead portion 4, as shown in FIG. 3. The rubber layer surrounds the outer peripheral surface of the carcass 5, so as to produce the sidewalls 3 and the tire tread 2.

One or more breaker layers 6 are disposed in the tire tread 2, as in the case of the embodiment of FIG. 1. The tire tread 2 has opposing edge portions e. Shoulders S are formed by the outer rubber layer, between the edge e of the tread 2 and the sidewall 3. An inner lining 9 is applied to the inner peripheral surface of the carcass 5, for making it airtight. A pair of elastomeric reinforcements 10, whose shape is substantially the same as those of FIG. 1, are bonded to the inner lining 9 on the surface opposite to the carcass 5. The thickest portion of each elastomeric reinforcement 10 faces the corresponding tire shoulder S across the inner lining 9 and the carcass 5, as shown in FIG. 3. This arrangement is particularly advantageous in the case of a radial tire, in which the rigidity of the sidewalls and shoulders is small as compared with that of the tread portion.

The thickness of each elastomeric reinforcement 10 gradually diminishes as it extends toward the corresponding bead portion 4 and a tire equator plane C—C. One edge of the elastomeric reinforcement 10 is disposed close to the tire equator plane C—C, while the opposite edge thereof faces the shoulder side edge of the stiffener 7 across the carcass 5. Thus, the reinforcement 10 and the stiffener 7 face each other across a part of the carcass 5.

FIG. 4 illustrates a tube less radial tire according to the present invention. which is similar to the embodiment of FIG. 3 except that a pair of elastomeric reinforcements 10 are disposed between a carcass and a rubber layer surrounding the carcass. More particularly, each of the two elastomeric reinforcements 10 of this embodiment is applied to the outer peripheral surface of a carcass 5 which consists of substantially radially disposed cords. An outer rubber layer is applied to the outer surface of the reinforcements 10, so as to form bead portions 4, sidewalls 3, shoulders S, and a tire tread 2 having two edges e. The cross sectional shape of each reinforcement 10 of this embodiment is substantially the same as the similarly numbered reinforcement of FIG. 3. The equator side edge of the reinforcement 10 is sandwiched between breaker layers 6 and the carcass 5, while the bead side edge of the reinforcement 10 is sandwiched by a stiffener 7 and the carcass 5, as shown in FIG. 4.

To prevent each of the reinforcements 10 of FIG. 3 from being separated from the liner 9, it is desirable not to expose the boundary therebetween. FIG. 5 illustrates an embodiment for such purposes. In this embodiment, equator side edges of two elastomeric reinforcements 10 are joined together and bonded to the inner surface of a carcass 5, so as to form a thin but continuous elastomer layer on the inner central portion of the carcass. The bead side edge of such elastomeric reinforcement 10 is extended to that end of the inner surface of the carcass 5 which is closest to the axis of rotation of the tire (not shown). The carcass 5, of course, has two such ends, one on each side of the equator plane C—C of the figure. As a result the thickness of the elastomeric reinforcement 10 varies, as the carcass 5 extends from one bead 8 to the other bead 8 through the tire equator, but the entire inner peripheral surface of the carcass is covered with the elastomer of the reinforcements 10. Thus, no junction between the carcass 5 and the elastomeric reinforcements 10 is exposed to the air.

With the embodiment of FIG. 5, it is important to make the elastomer layer very thin at and in the proximity of the tire equator plane C—C. If the equatorial portion of the tire should be heavy, e.g., by the presence of a thick reinforcement 10 there, high speed rotation of the tire on a highway will cause an increased centrifugal force in proportion to the weight of the equatorial portion. The increased centrifugal force tends to cause the tire equator portion to swell at high speed, which swell may reduce the width of the contact area between the tire tread and the road surface. The reduced width tends to cutdown the road contact area and will apparently hamper staple driving. The swell of the tire equator portion also tends to cause unevenness in distribution of the contact pressure between the tire and the road surface. Therefore, the thickness of the reinforcement at the tire equator should be minimized.

FIG. 6 illustrates the manner in which a pnematic safety tire of the present invention operates, e.g., the tire as illustrated in FIG. 3, when its internal pressure is lost. Similar operating conditions of a conventional pneumatic tire are shown in FIGS. 7 and 8, for the purpose of comparison.

Referring to FIG. 6, as the internal pneumatic pressure is lost, the reinforcements 10 of the present invention bear the load of vehicle (not shown), to which the tire is mounted, in cooperation with other parts of the tire. A rim 12 of conventional structure is used for facilitating the mounting of the tire to the vehicle. More particularly, the reinforcements 10 strengthen the sidewalls 3 of the tire 1 in such a manner that, the tire tread 2 is kept in stable contact with road surface G, without causing any substantial flexing thereof. As a result, a wide effective contact area, inclusive of the contact of the tire shoulder with the road surface, is ensured even if the internal pressure is suddenly lost during driving at a high speed. The reinforcement 10 also acts to retain a high rigidity of the sidewalls when the internal pressure is lost. Thus, with the tire of the present invention, a driver can control a vehicle safely under such conditions, by relying on the wide effective contact area.

It is one of the important features of the invention that the tire 1 with the reinforcements 10 enables vehicle driving over a few hundred kilometers after puncture. Thus, it is not necessary to stop a vehicle (not shown) on a highway for replacing a punctured tire with a spare tire. The stopping of a vehicle on a highway is very dangerous.

On the other hand, with the conventional tire 1a of FIG. 7, the sidewalls 3 are buckled upon loss of its internal pressure. Accordingly, a part of the inner surface of the tire is brought in contact with another part of the tire inner surface, as shown by symbols m and n of FIG. 7, respectively. As a result, the apparent grounding area of the tire seems to be increased. The actual effective grounding area is, however, reduced, because the rigidity of the sidewalls and the tire tread portion is almost completely lost upon the removal of its internal pressure, and only the small areas immediately below the rim flanges provide effective grouding contact, which small areas are represented by the symbols m and n in FIG. 7. More particularly, the load to the tire is born almost solely by the areas corresponding the portions m and n, as shown in FIG. 9. As the tire rotates, the parts m and n are heated by the friction therebetween. At the same time, the fatigue of the tire material is accelerated by such friction. Thus, if the internal pressure of the conventional tire 1a should be suddenly lost while driving at a high speed, the tire 1a tends to be broken fairly easily, because the aforesaid friction is very large when the driving speed is high. As a result, the driver cannot control the vehicle (not shown) under such conditions.

It should be noted here that the handling or operating characteristics of a vehicle depends on the grasping of the road surface by the tire. If the sidewalls of a conventional tire are buckled upon the loss of its internal pressure, e.g., by puncture, the effective ground contact area is greatly reduced, so that the grounding friction available for the tire control is reduced. Furthermore, the rigidity of the tire sidewalls, which is essential for transmitting the grounding friction to the vehicle, is lost upon the loss of the internal pressure, in the case of the conventional pneumatic tire. Consequently, upon occurrence of the internal pressure loss due to puncture or the like, the conventional pneumatic tire loses its cornering power, braking ability, lateral rigidity, stability, and other essential properties for safe driving of a vehicle.

It is apparent now that, with a conventional pneumatic tire, sudden loss of the internal pressure, e.g., by puncture, is very dangerous if it should occur on highway while driving at a high speed. The tire of the present invention eliminates such danger, by ensuring a wide contact area between the tire tread and road surface even if the tire internal pressure is lost.

FIG. 8 shows that wrinkles Z are formed in the sidewall 3 of the conventional tire 1a when its internal pressure is lost. As apparent to those skilled in the art, such wrinkles greatly accelerate the fatigue of the tire sidewall, so as to increase the risk of the aforesaid tire breakage. On the other hand, with the pneumatic safety tire 1 of the present invention, the elastomeric reinforcements 10 provide sufficient rigidity to the tire sidewalls 3 so as to eliminate the risk of wrinkles, as can be seen from FIG. 6. Thereby, the tire of the present invention ensures safe driving, at least temporarily, even if sudden loss of internal pneumatic pressure should occur during high-speed running on a highway.

To further improve the performance of the pneumatic safety tire of the invention, the following modifications are proposed.

1. One or more reinforcing layers may be disposed in the elastomeric reinforcement 10, which layers may consist of metallic wires, glass fiber cords, nylon cords, rayon cords, polyester, and/or vinylon cord.

2. The elastomeric reinforcements 10 may be strengthened by mixing short fibers therein, such as short fibers of metals, glass, nylon, polyester, rayon, and/or vinylon.

3. Each of the elastomeric reinforcements 10 may be made of a plurality of layers of the same or different materials, so as to optimize the tire performance under both normal and emergent conditions. In this case, the overall dimension of each elastomeric reinforcement 10 should satisfy the requirement of the present invention to be described hereinafter.

4. The dimensions and the material of the elastomeric reinforcement 10 should be selected so as to meet different characteristics of different tires. For instance, in the case of a tire having a comparatively large flateness or aspect ratio, as determined by a ratio of the longer to the shorter dimension of the cross section of the tire, the rigidity of its sidewall is comparatively small, so that comparatively thick reinforcements 10 should be used.

For fulfilling the aforesaid objects of the present invention, the elastomeric reinforcements 10 should have a hardness of not smaller than 45, preferably 60 to 90 as determined by the stipulations of JIS K6301-5. If the hardness falls outside of the aforesaid range, it will become difficult to ensure good high-speed performance and a long service life of the tire.

To bear the vehicular load without the tire internal pressure, the maximum thickness T of the reinforcement 10, which is measured in a direction normal to the inner surface thereof, as shown in FIG. 1, should be 3% or more of the maximum tire section width W, when the tire 1 is inflated at rated internal pressure. If the maximum thickness T is less than 3% of the width W, the sidewalls 3 tend to buckle upon loss of the tire internal pressure. The maximum thickness T should not be greater than 15%, preferable not greater than 9%, of the maximum tire section width W under inflated condition. The maximum thickness T of the reinforcement 10 in excess of 15% of the maximum tire section width W tends to cause an undesirably high temperature rise due to insufficient heat dissipation.

When the maximum thickness of the reinforcement 10 is more than 9% of the tire width under inflated condition, the elastomer of the reinforcement 10 should preferably have a heat conductivity of not smaller than $5 \times 10^{-4}$ cal/cm·sec.°C, so as to ensure sufficient heat dissipation therethrough. The inventors have found out through tests that an elastomer having a composition as shown in the following Table 1 fulfills the aforesaid heat conductivity requirement.

The inventors have also found out through tests that one edge of the reinforcement 10 should extend toward the tire equator plane C—C and should reach at least to that portion of the carcass inner surface which corresponds to the edge e of the tire tread 2, as shown in FIG. 1. The opposing edge of the reinforcement 10 should extend toward the bead portion 4 of the tire and should reach at least that portion of the carcass inner surface which corresponds to one half of the tire section height. Each reinforcement 10 should have a maximum thickness T at an intermediate portion between the two edges, and the thickness should gradually diminish as it extends toward both the tire equator plane C—C and the bead portion 4.

The invention will now be described in further detail by referring to an Example.

EXAMPLE

The following test tires of the construction, as shown in FIG. 1, were prepared.

| Size: | 175/70 HR 13 |
|---|---|
| Carcass: | Two plies, each consisting of rayon cords, which cords are radially disposed, relative to the axis of rotation of the tire. |
| Breaker: | Four breaker plies consisting of rayon cords. |

An example of the composition of the elastomer for the reinforcements 10 which has a high heat conductivity is shown in the following Table 1.

Table 1

| Ingredients | Parts by weight |
|---|---|
| Natural rubber | 20 |

Table 1-continued

| Ingredients | Parts by weight |
|---|---|
| Polybutadiene | 80 |
| Acetylene black | 70 |
| Oil | 5 |
| Zinc white | 20 |
| Sulfur | 3.75 |
| Accelerator CZ* | 1.5 |
| Antioxidant RD** | 1 |
| Stearic acid | 3 |

*CZ; N-cyclohexyl benzothiazol 2 sulfenamide
**RD; 2,2,4-tri-methyl dihydroquinoline The elastomer which was used in this Example for the reinforcement 10 was similar to that for the stiffener 7 of FIG. 1. Such stiffener composition proved to have a large hardness, and when it is formed into a comparatively thick reinforcement, the heat conductivity thereof was high and the heat generation therein was small.

The elastomeric reinforcement, as mounted on the tire, had a JIS hardness of 83, and its maximum thickness T was 8 mm, which corresponded to 4.5% of the maximum tire section width under inflated conditions at rated internal pressure.

The test tires were mounted on 5J rims, and high-speed running tests were made on test drums, and the test conditions and the test result were as shown in Tables 2 and 3, respectively.

Table 2

| Inner pressure | Load | Running conditions | Drum diameter | Drum surface | Room temperature |
|---|---|---|---|---|---|
| 2.2 Kg/cm² | 325 Kg | Continuous | 1 m | Smooth | 38°±3°C |

Table 3

| Test step | 1 | 2 | 3 | 4 | 5 | 6 | 7 | 8 | 9 | 10 | 11 | 12 | 13 |
|---|---|---|---|---|---|---|---|---|---|---|---|---|---|
| Time (minute) | 5' | 5' | 5' | 5' | 5' | 5' | 5' | 5' | 5' | 5' | 5' | 5' | 3'* |
|  | " | " | " | " | " | " | " | " | " | " | " | " | 2' |
| Speed (Km/hour) | 100 | 120 | 140 | 160 | 180 | 200 | 210 | 220 | 230 | 240 | 250 | 260 | 270 |

*The upper line of the "Time" row represents the testing time for the test tires of the invention, while the lower line of the row represents the similar time for reference tires of conventional structure. For instance, the test tires of the present invention were run at 270 Kg/hour for 3 minutes, while the reference tires were run at the same speed for only 2 minutes.

The Reference tires in Table 3 were identical to the test tires of the present invention except that no elastomeric reinforcements 10 were applied to the reference tires. In producing the test tires of the present invention, the elastomeric reinforcements 10 were separately formed by extrusion, as in the case of tread rubber, and the reinforcements 10 thus formed were applied to a cylindrical former, so as to fabricate the test tires in the same manner as conventional tires, and the test tires were completed by vulcanization in a conventional fashion. The test of Table 3 proved the ability of the pneumatic safety tire of the invention to withstand high-speed driving on highways.

The pneumatic safety tire of the present invention has the following features.

1. When the internal pressure of the tire of the invention is suddenly lost by puncture or burst, the elastomeric reinforcements bear the load of a vehicle to which the tire is mounted, so as to ensure the safe driving by maintaining a large effective contact area between the tire and the road surface. In addition to the safe driving at the time of sudden loss of the internal pressure, the pneumatic safety tire of the invention also eliminates the need of tire exchange on dangerous highways or in the midst of heavy traffic, possibly under bad weather conditions, because it can run over hundreds of kilometers after the loss of internal pressure. Thus, a driver can reach a place for repair without exchanging the punctured tire with a spare tire. Further to the aforesaid tests of Example, the inventors have tested the pneumatic safety tire by driving it over a distance of 100 Km (a distance which is long enough for reaching a place for repair) at a speed of 50 Km/hour after completely removing its internal pressure. Then, the tire thus driven over 100 Km was inflated and subjected to the high-speed performance test according to the specification No. 109 of FMVSS (Federal Motor Vehicle Safty Standard), which the tire satisfactorily passed without difficulty. This is a remarkable improvement, because a conventional pneumatic tire will be broken after running about 2 Km without internal pressure.

2. The heat generation in the pneumatic safety tire of the present invention under inflated condition at rated internal pressure is of similar magnitude to that of a conventional tire, so that the pneumatic safety tire of the invention can be run on highways at a high speed in the same way as conventional pneumatic tires for the purpose. On the other hand, when the internal pressure is lost, the pneumatic safety tire of the invention does not produce any serious stress concentration, so that its heat generation is suppressed and it can run over a long distance under punctured conditions, without any internal pressure.

3. The inventors have found out that, under inflated normal running conditions, the pneumatic safety tire of the present invention has an improved cornering power characteristic, which is superior to that of conventional tires by about 10%.

4. When the internal pressure is lost, conventional pneumatic tires almost completely lose their cornering power, because the effective contact area between the treads thereof and the road surface is minimized and the sidewall rigidity is lost. On the other hand, the pneumatic safety tire of the present invention can maintain sufficiently high cornering power for ensuring safe driving even when its internal pressure is lost, because its tread can retain a large effective contact area with the road surface and its sidewalls retain a large hardness even after the loss of its internal pressure. The tire of the invention has a cornering power under punctured conditions, which is about 45% of the cornering power under normal condition.

5. The pneumatic safety tire of the present invention ensures high comfort comparable with that of conventional tires, under normal running conditions.

6. When the internal pressure is lost, the pneumatic safety tire of the present invention retains a reasonable level of comfort comparable with that under normal running conditions with a rated internal pressure.

7. As compared with other safety tires, the pneumatic safety tire of the invention is simpler and easier to manufacture, so that the latter can be produced at a lower cost.

We claim:

1. In a pneumatic safety tire for high speed vehicle driving on a highway, including a pair of annular beads, a carcass extending across the two beads, an annular tread portion formed on the outer peripheral surface of the carcass, a pair of shoulders formed at opposite edges of said tread portion and extending toward each bead, a pair of sidewalls formed between one of the beads and the corresponding shoulder portion, the improvement characterized by: a pair of annular elastomeric reinforcements each having at least one elastomer element continuously disposed from the tread portion to the bead portion along the carcass so as to supplement the thickness of said sidewall and thereby enhance the inherent rigidity of the sidewall and its ability to support a load under conditions of reduced tire pressure, each said elastomeric reinforcement consisting of a elastomer having a JIS hardness of not less than 45 and a maximum thickness of from 3 to 15% of the maximum tire width when the tire is inflated under pressure, the thickness of each said elastomeric reinforcement gradually diminishing as the reinforcement extends toward the corresponding bead and tire equator, and the elastomer forming the reinforcements having heat conductivity of not smaller than $5 \times 10^{-4}$ cal/cm·sec. °C.

2. A pneumatic safety tire according to claim 1, wherein the two elastomeric reinforcements are disposed on the inner peripheral surface of the carcass.

3. A pneumatic safety tire according to claim 1, wherein those portions of the pair of annular elastomeric reinforcements which extend toward the tire equator are joined together and bonded to the tire inner surface.

4. A pneumatic safety tire according to claim 1 and further comprising an inner liner extending along the inner peripheral surface of the carcass.

5. A pneumatic safety tire according to claim 1, wherein the carcass consists of cords which are disposed substantially radially, relative to the axis of rotation of the tire.

6. A pneumatic safety tire according to claim 1, further including an additional reinforcement comprising a pair of stiffeners made of rubber each extending from said bead to said side wall.

7. A pneumatic safety tire according to claim 1, wherein the maximum thickness of each elastomeric reinforcement is not greater than 9% of the tire section width.

8. A pneumatic safety tire according to claim 1, wherein the elastomer forming the two reinforcements has a JIS hardness of 60 to 90.

9. A pneumatic safety tire according to claim 1, wherein the carcass means consists of cords which are disposed in radial directions emanating from axis of rotation of the tire.

10. A pneumatic safety tire according to claim 1, wherein the thin portions of the two reinforcements which extend toward the tire equator are bonded together while the opposing thin portions of the two reinforcements extend as far as corresponding ׅ ‥ p⋯ tions.

11. A pneumatic safety tire according to claim 1, wherein each of the reinforcements has at least one strengthening layer which is made of a material selected from the group consisting of metal wires, glass fiber cords, nylon cords, rayon cords, and polyester cords.

12. A pneumatic safety tire according to claim 1, wherein each of the reinforcements includes short strengthening fibers dispersed therein, which are selected from the group consisting of metal fibers, glass fibers, nylon fibers, rayon fibers, vinylon fibers, and polyester fibers.

13. In a pneumatic safety tire for high speed vehicle driving on a highway, including a pair of annular beads, a carcass extending across the two beads, an annular tread portion formed on the outer peripheral surface of the carcass, a pair of shoulders formed at opposite edges of said tread portion and extending toward each bead, a pair of side walls formed between one of the beads and the corresponding shoulder portion, and an additional reinforcement for each bead extending in the direction of the sidewall, the improvement characterized by: a pair of annular elastomeric reinforcements each having at least one elastomer element continuously disposed from the tread portion to the bead portion along the carcass so as to supplement the thickness of said sidewall and thereby enhance the inherent rigidity of the sidewall and its ability to support a load under conditions of reduced tire pressure, each said elastomeric reinforcement consisting of an elastomer having a JIS hardness of not less than 45 and a maximum thickness of from 3 and 15% of the maximum tire width when the tire is inflated under pressure, the thickness of each said elastomeric reinforcement gradually diminishing as the reinforcement extends toward the corresponding bead and tire equator, and the extension of each elastomeric reinforcement toward the corresponding bead at least partially overlapping the additional reinforcement for each bead, and the elastomer forming the reinforcements having heat conductivity of not smaller than $5 \times 10^{-4}$ cal/cm·sec. °C.

14. A pneumatic safety tire according to claim 13, wherein the two elastomeric reinforcements are disposed on the outer peripheral surface of the carcass, so as to extend between the carcass and a rubber layer forming the sidewalls and the tread.

15. A pneumatic safety tire according to claim 13, wherein the carcass means consists of at least two carcass plies, and the two elastomeric reinforcements are disposed between adjacent carcass plies.

16. A pneumatic safety tire according to claim 13, wherein those portions of the pair of annular elastomeric reinforcements which extend away from the tire equator reach the corresponding tire bead portions, respectively.

17. A pneumatic safety tire according to claim 13, wherein the two elastomeric reinforcements are applied to the outer peripheral surface of the carcass in such a manner that the bead side end of each reinforcement is sandwiched between the sidewall side end of the corresponding stiffener and the carcass.

18. A pneumatic safety tire according to claim 13, wherein the pair of annular elastomeric reinforcements are disposed between adjacent carcass plies.

19. A pneumatic safety tire according to claim 13, wherein each of the reinforcements embedded between the outer peripheral surface of the carcass and the inner peripheral surface of the sidewall having a thickest portion thereof at a position corresponding to the tire shoulder.

* * * * *